(12) United States Patent
Yu et al.

(10) Patent No.: US 6,636,377 B1
(45) Date of Patent: Oct. 21, 2003

(54) METHOD OF TUNING FEED-FORWARD CONTROL IN A DISK DRIVE

(75) Inventors: Jie Yu, Irvine, CA (US); David B. Joan, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/608,573

(22) Filed: Jun. 30, 2000

(51) Int. Cl.[7] ............................................. G11B 5/596
(52) U.S. Cl. ............................. 360/78.07; 360/78.08; 360/78.06; 360/78.09
(58) Field of Search ...................... 360/77.08, 78.04, 360/78.06, 78.07, 78.08, 78.09, 78.14; 318/560, 561

(56) References Cited

U.S. PATENT DOCUMENTS 5,859,742 A * 1/1999 Takaishi .................. 360/78.01
6,239,940 B1 * 5/2001 Sasamoto et al. ........ 360/78.09
6,504,670 B1 * 1/2003 Dittmar ................... 360/78.07

* cited by examiner

*Primary Examiner*—Andrew L. Sniezek
(74) *Attorney, Agent, or Firm*—Milad G. Shara, Esq.; Myers Dawes Andras & Sherman

(57) ABSTRACT

A method of tuning a servo control system in a disk drive that implements seeks using a the feed-forward command effort signal $u_{ffwd}$ and a PES reference signal r that were designed to be compatible with one another on the basis of a modeled frequency response $G_0(z)$ that is different from an actual frequency response $G(z)$. The steps includes scaling the feed-forward command effort signal $u_{ffwd}$ to substantially achieve a zero velocity condition at an end of the seek; scaling the feed-forward command effort signal $u_{ffwd}$ to substantially achieve an on-target condition at the end of the seek; and modifying the PES reference signal r such that it substantially varies in unison with the indicated PES signal y during the seek

22 Claims, 13 Drawing Sheets

| Seek Length (tracks) | m (learning duration only in samples) | n (total feed-forward duration in samples, learning and adapting) |
|---|---|---|
| 1-2 | 6 | 6* |
| 3-15 | 7 | 10 |
| 16-35 | 8 | 14 |
| 36-80 | 10 | 20 |
| 81-160 | 11 | 28 |

* In the very short 1-2 track case m=n=6 such that the controller is always learning, but never adapting.

Figure 6

1-2 Track Seeks
m=6, *n=6

| sample i | 1x PES reference r | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 8168 | 11118 | 14628 | 14772 | 0 |
| 2 | 32704 | 13992 | 11438 | 8274 | 4564 | 0 |
| 3 | 27992 | 927 | -2445 | -5260 | -7437 | 0 |
| 4 | 16507 | -8900 | -9695 | -9858 | -9520 | 0 |
| 5 | 6261 | -8736 | -7705 | -6357 | -5120 | 0 |
| ***6 | 1118 | -3354 | -2156 | -1198 | -479 | **0 |

Figure 7

This is the nominal feed-forward table that contains the single-rate (1x) reference position signal r(t) and the multi-rate (4x) feed-forward command effort signal $u_{ffwd}$, prior to being calibrated for a particular drive or group of drives.

1-2 Track Seeks
m=6, *n=6

| sample i | 1x PES reference r | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 8168 | 11118 | 14628 | 14772 | 0 |
| 2 | 32704 | 13992 | 11438 | 8274 | 4564 | 0 |
| 3 | 27992 | 927 | -2445 | -5260 | -7437 | 0 |
| 4 | 16507 | -8900 | -9695 | -9858 | -9520 | 0 |
| 5 | 6261 | -8736 | -7705 | -6357 | -5120 | 0 |
| ***6 | 1118 | -3354 | -2156 | -1198 | -479 | **0 |

Figure 7-a

The bolded values represent the positive portion of the feed-forward command effort signal $u_{ffwd}$. The subject values are scaled larger or smaller with the velocity-related scaling factor $K_{plus}$ in order to make the residual velocity equal zero (values not actually changed).

1-2 Track Seeks
m=6, *n=6

| sample i | 1x PES reference r | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 8168 | 11118 | 14628 | 14772 | 0 |
| 2 | 32704 | 13992 | 11438 | 8274 | 4564 | 0 |
| 3 | 27992 | 927 | -2445 | -5260 | -7437 | 0 |
| 4 | 16507 | -8900 | -9695 | -9858 | -9520 | 0 |
| 5 | 6261 | -8736 | -7705 | -6357 | -5120 | 0 |
| ***6 | 1118 | -3354 | -2156 | -1198 | -479 | **0 |

Figure 7-b

The bolded values represent all of the values of the feed-forward command effort signal $u_{ffwd}$. These values are scaled up or down, together, on the basis of the position-related scaling factor $K_{ffwd}$ in order to make the final error signal equal zero (values not actually changed).

1-2 Track Seeks
m=6, *n=6

| sample i | 1x PES reference r | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 8168 | 11118 | 14628 | 14772 | 0 |
| 2 | 32704 | 13992 | 11438 | 8274 | 4564 | 0 |
| 3 | 27992 | 927 | -2445 | -5260 | -7437 | 0 |
| 4 | 16507 | -8900 | -9695 | -9858 | -9520 | 0 |
| 5 | 6261 | -8736 | -7705 | -6357 | -5120 | 0 |
| ***6 | 1118 | -3354 | -2156 | -1198 | -479 | **0 |

Figure 7-c

Here, the bolded values represent the PES reference signal. Some or all of the bolded PES reference values are individually adjusted up or down in view of the actual error signal experienced during the calibration process so that the PES reference, so tuned, results in substantially no feedback error signal during subsequent use (values not actually changed).

3-15 Track Seeks
m=7, *n=10

| sample i | 1x PES reference r | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 1821 | 2713 | 3910 | 4567 | 0 |
| 2 | 32746 | 5132 | 5346 | 5372 | 5151 | 0 |
| 3 | 31606 | 4759 | 4205 | 3540 | 2793 | 0 |
| 4 | 27577 | 2003 | 1198 | 410 | -332 | 0 |
| 5 | 21453 | -1008 | -1613 | -2138 | -2577 | 0 |
| 6 | 14633 | -2927 | -3187 | -3363 | -3457 | 0 |
| 7 | 8695 | -3476 | -3429 | -3322 | -3165 | **-171 |
| 8 | 4362 | -2965 | -2733 | -2473 | -2198 | -156 |
| 9 | 1836 | -1904 | -1617 | -1306 | -1042 | -122 |
| ***10 | 652 | -692 | -445 | -247 | -99 | -70 |

Figure 8

16-35 Track Seeks
m=8, *n=14

| sample i | 1x PES reference r | 4x Feed-Forward Command Effort Signal $u_{ffwd}$ | | | | $u_{adapt}[i]$ $S_{m()}$ |
|---|---|---|---|---|---|---|
| | | FF1 | FF2 | FF3 | FF4 | |
| 1 | 32767 | 669 | 1026 | 1522 | 1853 | 0 |
| 2 | 32756 | 2182 | 2412 | 2592 | 2696 | 0 |
| 3 | 32324 | 2741 | 2722 | 2650 | 2525 | 0 |
| 4 | 30569 | 2358 | 2153 | 1917 | 1657 | 0 |
| 5 | 27440 | 1381 | 1094 | 803 | 511 | 0 |
| 6 | 23222 | 225 | -50 | -306 | -546 | 0 |
| 7 | 18416 | -767 | -968 | -1146 | -1303 | 0 |
| 8 | 13671 | -1436 | -1546 | -1633 | -1698 | **-216 |
| 9 | 9409 | -1741 | -1765 | -1769 | -1756 | -214 |
| 10 | 5938 | -1727 | -1684 | -1627 | -1560 | -205 |
| 11 | 3355 | -1482 | -1396 | -1304 | -1206 | -185 |
| 12 | 1703 | -1103 | -999 | -891 | -785 | -152 |
| 13 | 742 | -675 | -572 | -461 | -370 | -110 |
| ***14 | 306 | -249 | -160 | -89 | -36 | -59 |

Figure 9

36-80 Track Seeks
m=10, *n=20

| sample $i$ | 1x PES reference $r$ | 4x Feed-Forward Command Effort Signal $u_{ffwd}$ | | | | $u_{adapt0}[i]$ $S_{m0}$ |
|---|---|---|---|---|---|---|
| | | FF1 | FF2 | FF3 | FF4 | |
| 1 | 32767 | 233 | 364 | 547 | 684 | 0 |
| 2 | 32762 | 826 | 943 | 1052 | 1140 | 0 |
| 3 | 32597 | 1214 | 1272 | 1313 | 1339 | 0 |
| 4 | 31932 | 1349 | 1345 | 1328 | 1296 | 0 |
| 5 | 30631 | 1254 | 1200 | 1137 | 1064 | 0 |
| 6 | 28643 | 986 | 899 | 810 | 714 | 0 |
| 7 | 26041 | 617 | 516 | 416 | 315 | 0 |
| 8 | 22934 | 215 | 116 | 22 | -70 | 0 |
| 9 | 19607 | -156 | -240 | -318 | -392 | 0 |
| 10 | 16233 | -461 | -525 | -583 | -636 | **-127 |
| 11 | 12977 | -683 | -724 | -760 | -791 | -131 |
| 12 | 9959 | -816 | -836 | -851 | -861 | -135 |
| 13 | 7346 | -867 | -867 | -864 | -857 | -137 |
| 14 | 5185 | -846 | -831 | -814 | -793 | -132 |
| 15 | 3461 | -770 | -744 | -716 | -686 | -121 |
| 16 | 2172 | -655 | -622 | -588 | -553 | -105 |
| 17 | 1255 | -518 | -481 | -445 | -408 | -86 |
| 18 | 673 | -371 | -334 | -297 | -261 | -65 |
| 19 | 347 | -225 | -191 | -154 | -125 | -44 |
| ***20 | 189 | -86 | -55 | -31 | -12 | -23 |

Figure 10

METHOD OF TUNING FEED-FORWARD CONTROL IN A DISK DRIVE

FIELD OF THE INVENTION

The present invention relates generally to magnetic disk drives and, more particularly, to a method of tuning feed-forward control in a disk drive.

BACKGROUND OF THE RELATED ART

Magnetic disk drives generally read and write data on the surface of a rotating magnetic disk with a transducer that is located at the far end of a moveable actuator. A servo control system uses servo control information recorded amongst the data, or on a separate disk, to controllably drive a voice coil motor (VCM) that moves the transducer from track to track ("seeking") and to hold the transducer at a desired position ("track following"). A detailed discussion of servo control systems is unnecessary because such systems are well known as set forth, for example, in patent application Ser. No. 09/138,841 that was filed on Aug. 8, 1998, now U.S. Pat. No. 6,204,988 entitled "DISK DRIVE CAPABLE OF AUTONOMOUSLY EVALUATING AND ADAPTING THE FREQUENCY RESPONSE OF ITS SERVO CONTROL SYSTEM," and is commonly owned by the assignee of this application.

Most disk drives have previously been used for storing conventional data files of the type that are associated with personal computers. In such applications, data integrity is paramount relative to other considerations such as seek times and the reduction of acoustic noise. It presently appears, however, that disk drives are likely to become popular for recording and replaying audiovisual data—e.g. a drive based recording device that replaces video cassette recorders (VCRs). A drive-based recording device of this nature will benefit from using a disk drive with faster seek times because it will spend less time moving its actuator where it needs to be and have more time to record or recover information in any given unit of time. The drive-based recording device, therefore, may be able to record and/or playback more audiovisual data streams that otherwise possible. At the same time, the drive-based recording device is likely to be located adjacent to a television or be in some other location where acoustic noise issues arise. Accordingly, it is equally important for the disk drive to implement its seeks in as quiet a manner as possible.

The drive industry has progressed through several stages of development as related to seeks. Of particular relevance here, is the prior use of a so-called "bang-bang" seek profile wherein the transducer is rapidly accelerated at the start of a seek and then rapidly decelerated at the end of a seek using saturated levels of command effort (current or voltage). A bang-bang seek profile moves the transducer to a target position in as rapid a manner as possible. On the other hand, because the bang-bang acceleration profile is a square wave, it is relatively loud and it contains many high frequency components that may detrimentally excite a mechanical resonance that causes the transducer to take longer to settle into the target position. It has previously been determined that a quieter, faster settling seek is possible by "shaping" the transducer's acceleration profile so that it does not appear like a square wave, but rather approximates a single frequency sine wave. The result is a shaped seek profile that is "close" to a bang-bang square wave but is quieter and does not contain the high frequency components that may excite the drive's resonant frequencies.

Modern disk drives generally use a sampled servo control system that only periodically receives position information (e.g. once per servo sector) and shortly thereafter outputs a command effort based on a deviation between the indicated position and the target position. The servo control system in such a drive implements a shaped seek profile as a feed-forward profile using a feed-forward control path as a feed-forward profile using as discussed,for example, in co-pending patent application Ser. No. 09/538,931 pending that was filed on Mar. 31, 2000, entitled "DISK DRIVE WITH FEED-FORWARD CONTROL PATH THAT RECEIVES A REFERENCE POSITION SIGNAL TO APPLY A FEED-FORWARD COMMAND EFFORT AT A RATE GREATER THAN A SERVO SAMPLING RATE," (the "Multi-rate Feed-Forward Application"), which application is commonly owned by the assignee of this application and hereby incorporated by reference in its entirety.

Modeling errors in the feed-forward control path, however, may cause the servo to inaccurately follow the intended feed-forward profile. In the Multi-rate Feed-Forward Application, the feed-forward control path models the VCM and overall plant as a rigid body that responds equally to all input frequencies in terms of magnitude and phase, i.e. it implements a simple double derivative of the PES reference signal to form a sinusoidal seek profile without regard to the frequency-dependent variance of the VCM. Obviously, in such case, the effectiveness of the feed-forward control path will diminish to the extent that the actual VCM response $G(z)$ differs from the modeled VCM response $G_0(z)$.

The most prevalent modeling errors are gain errors due to variation in the values of the motor torque constant ($K_T$) and the motor winding resistance ($R_W$) due to changes in temperature, calibration errors, track pitch errors, and other factors. These modeling errors may cause the actuator to either overshoot or undershoot the target position at the end of the shaped seek, and thereby increase the required settling time for seeks of all lengths.

One could simply rely on the feedback loop that contains the feedback control path to repeatedly, reactively reign in any deviation caused by the feed-forward control path's modeling error in a sample-by-sample fashion (as in the above-referenced Multi-rate Feed-forward application), but system performance would be improved if the effect of the modeling error could be eliminated or reduced.

One approach to addressing the deviation between actual and modeled frequency response is the inclusion of an adaptive control path that characterizes the difference and dynamically accounts for it during each seek. One such system monitors the error signal e during the first several samples of a seek in order to characterize any modeling error between the modeling VCM response $G_0(z)$ and the actual VCM response $G(z)$ and thereafter outputs an adaptive command effort during subsequent samples to compensate for such modeling error and thereby tends to make the error signal e approach zero at the end of the seek or, equally speaking, to make the transducer 80 arrive at the target position at the end of the seek notwithstanding the modeling error. This approach was discussed in detail in co-pending patent application Ser. No. 09/539,349 pending that was filed on Mar. 31, 2000, entitled "DISK DRIVE WITH ADAPTIVE CONTROL PATH THAT PRODUCES AN ADAPTIVE CONTROL EFFORT BASED ON A CHARACTERIZED DEVIATION BETWEEN ACTUAL AND MO[D]ELED PLANT RESPONSE," (the "Adaptive Control Path Application"), which application is commonly owned by the assignee of this application and hereby incorporated by reference in its entirety.

The Multi-rate Feed-Forward Application and the Adaptive Control Path Application represent significant advances. Neither, however, does anything to eliminate or reduce the modeling error between the modeled VCM response $G_0(z)$ and the actual VCM response $G(z)$ in advance of actually starting a seek. That modeling error is embodied in the disk drive's feed-forward control, and, more particular, in the relationship between the position reference signal and the feed-forward control signal that were cooperatively derived on the basis of the modeled VCM response $G_0(z)$.

There remains a need, therefore, for a method of tuning feed-forward control in a disk drive.

SUMMARY OF THE INVENTION

The invention may be regarded as a method of tuning a servo control system in a disk drive having a disk with servo control information recorded thereon, a transducer for reading the servo control information, a servo control system that produces a control signal by combining (1) a feed-forward command effort signal $u_{ffwd}$ and (2) a feedback command effort signal $u_{fb}$ derived from a difference between (i) a target position that is controllably varied with a PES reference signal r and (ii) an indicated position that includes an indicated PES signal y derived from the servo control information read by the transducer; and a voice coil motor (VCM) characterized by an actual frequency response $G(z)$ for positioning the transducer in response to the control signal; wherein the feed-forward command effort signal $u_{ffwd}$ and the PES reference signal r are designed to be compatible with one another on the basis of a modeled frequency response $G_0(z)$ such that the PES reference signal r and indicated PES signal y vary in unison during a seek when the servo control system uses the feed-forward command effort signal $u_{ffwd}$ to position the transducer from an initial track position to a final target position, and wherein the actual frequency response $G(z)$ is different than the modeled frequency response $G_0(z)$ such that the feed-forward command effort signal $u_{ffwd}$ and the PES reference signal r are not compatible with one another. In the preferred embodiment, the method comprises the steps of scaling the feed-forward command effort signal $u_{ffwd}$ to substantially achieve a zero velocity condition at an end of the seek; scaling the feed-forward command effort signal $u_{ffwd}$ to substantially achieve an on-target condition at the end of the seek; and modifying the PES reference signal r such that it substantially varies in unison with the indicated PES signal y during the seek.

BRIEF DESCRIPTION OF THE DRAWINGS

The just summarized invention can be best understood with reference to the following description taken in view of the drawings of which:

FIG. 6 is a table representing the feed-forward durations for short to medium length seeks from as little as 1 track to as many as 160 tracks, that overall range being divided into five different sub-ranges;

FIG. 7 is a representative feed-forward table used for 1–2 track seeks;

FIG. 7-a shows in bold the values that represent the positive portion of the feed-forward command effort signal $u_{ffwd}$, such values being scaled larger or smaller with the velocity-related scaling factor $K_{plus}$ in order to make the residual velocity equal zero (values not actually changed);

FIG. 7-b shows in bold all of the values of the feed-forward command effort signal $u_{ffwd}$, such values being scaled up or down, together, on the basis of the position-related scaling factor $K_{ffwd}$ in order to make the final error signal equal zero (values not actually changed);

FIG. 7-C shows in bold the values of the PES reference signal, some or all of the bolded PES reference values being individually adjusted up or down in view of the actual error signal experienced during the calibration process so that the PES reference, so tuned, results in substantially no feedback error signal during subsequent use (values not actually changed).

FIGS. 8–10 are representative feed-forward tables used for 3–15 track seeks, 16–35 track seeks, and 36–80 track seeks (the longest table for seek lengths of 81–160 tracks is omitted for the sake of brevity);

DETAILED DESCRIPTION OF THE PREFERRED EMBODIMENT

Figure 1:
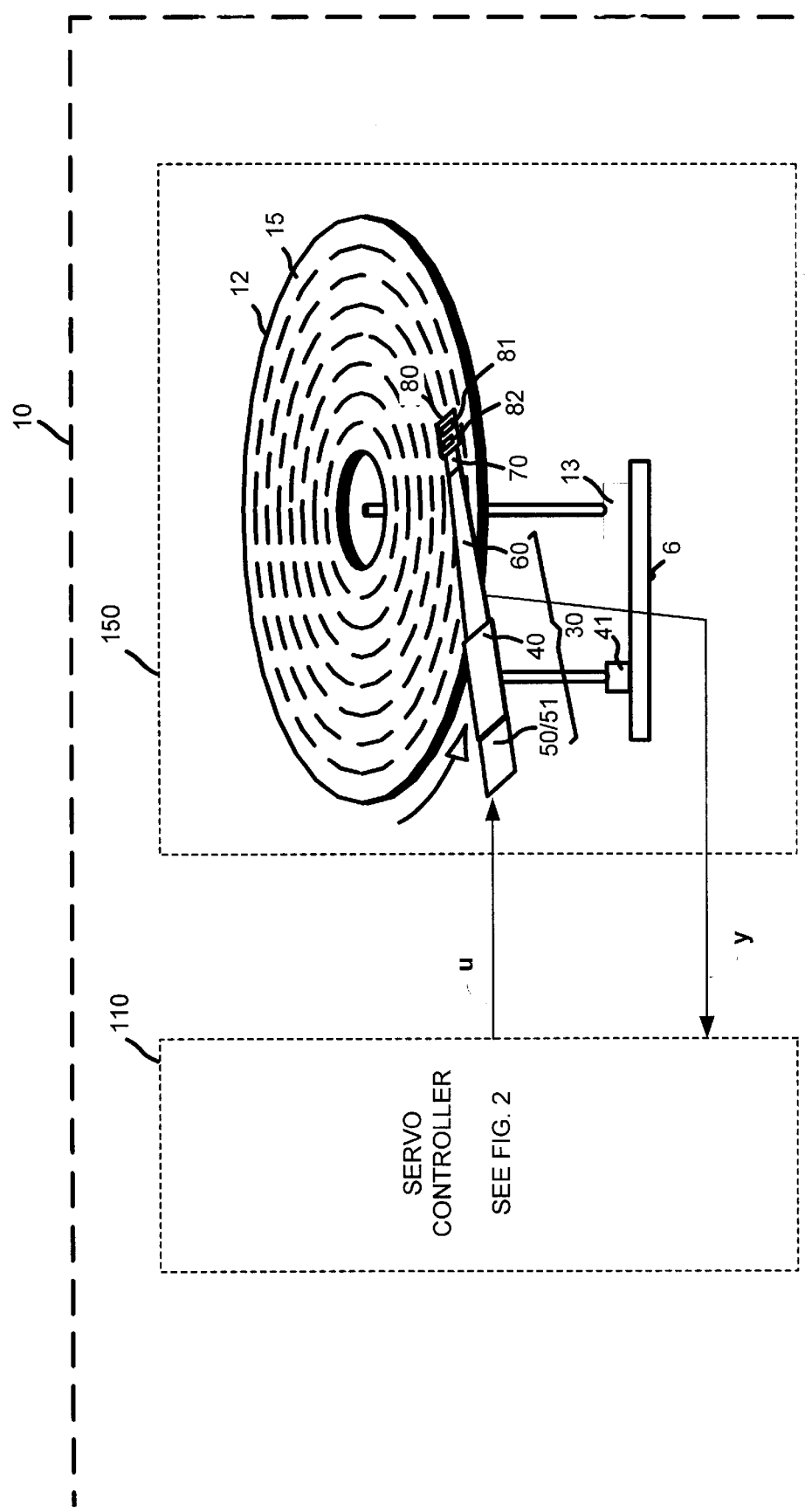
FIG. 1 is a block diagram of a disk drive having a servo controller and disk drive plant that may benefit from the method of this invention, with emphasis on the components of the plant including the VCM 50/51.
Figure 2:
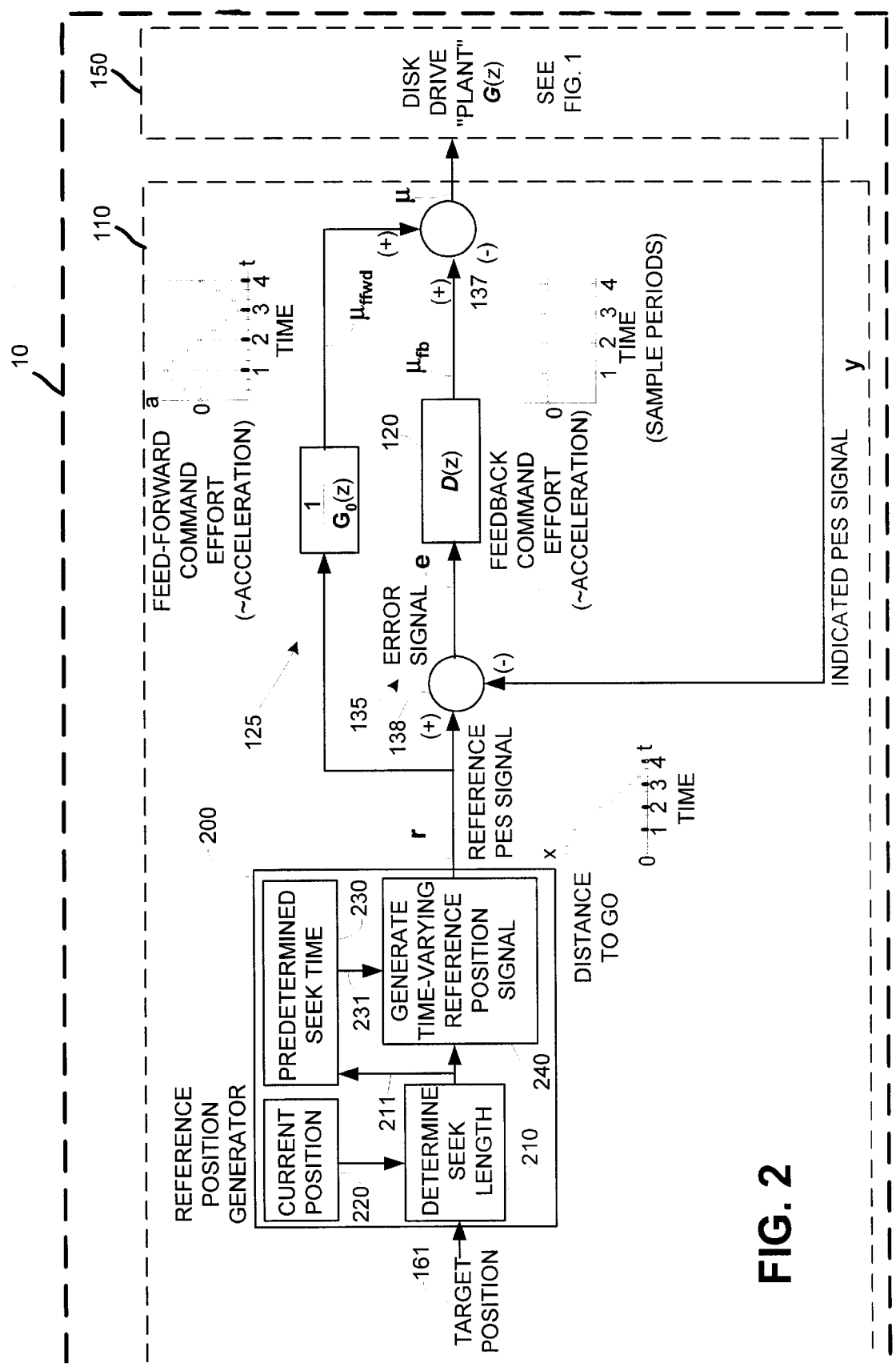
FIG. 2 is block diagram of the disk drive with emphasis on the components of the servo controller.

As shown in cooperative FIGS. 1 and 2, a disk drive 10 according to this invention generally comprises a servo controller 110 and a disk drive "plant" 150. FIG. 1 emphasizes the details of the plant 150 being controlled and FIG. 2 emphasizes the details of the servo controller 110 including a feed-forward control path 125, a feedback control path 135, and in this particular case, an adaptive control path 145.

A. The Preferred Embodiment—Generally

As shown in FIG. 1, the plant 150 generally comprises a base 6, a spindle motor 13 connected to the base 6, and a magnetic disk 12 connected to the spindle motor 6 (only one is shown, but there are generally two or more disks). The plant 150 also includes a swing-type actuator 30 consisting of a pivot body 40 that rotates on a pivot cartridge 41, a voice coil motor (VCM) 50/51 (e.g. a coil 50 and permanent magnets 51) extending to one side of the pivot body 40, an actuator arm 60 extending from the other side of the pivot body 40, and a head gimbal assembly (HGA) 70 that includes a transducer 80. The particular transducer 80 shown includes separate read and write transducers 81, 82 as found in a magetoresistive head (MR head), but single transducer heads such as a conventional inductive head (not shown) may also be used.

The VCM 50/51 moves the transducer 80 in response to a total command effort u received from the servo controller 110 and the transducer 80 periodically samples servo position information recorded in servo tracks 15 on the disk 12 at a servo sampling rate to produce an indicated PES signal y. The servo sampling rate is determined by the number of servo sectors per revolution and the rotational speed of the disk 12

FIG. 2 is a block diagram of the servo controller 110 that receives both a target position 161 and the indicated PES signal y and then generates the total command effort u that is provided to the disk drive's VCM 50/51 for controllably seeking the transducer 80 to the target position 161. FIG. 2's various system blocks and signal lines include:

| | |
|---|---|
| G(z) | actual frequency response of the plant 150 (VCM actuator and supporting structure) in the discrete-time domain |
| D(z) | designed frequency response of the feedback compensator |
| $G_0(z)$ | modeled frequency response of the plant 150 in the discrete-time domain |
| r | PES reference signal |
| y | indicated PES signal |
| e | δPES signal, the difference between the PES reference signal r and the indicated PES signal y |
| u | total command effort |
| $u_{ffwd}$ | feed-forward command effort |
| $U_{fb}$ | feedback command effort |

In more detail, the servo controller 110 comprises a reference position generator 200 that receives a target position 161 (e.g. a particular location such as track 5,010) and thereafter provides the PES reference signal r so that it varies as a function of time along a modeled position profile for moving the transducer 80 (see FIG. 1) from a start position to the target position in a controlled fashion. The servo control system in the preferred disk drive operates on a periodic, discrete time basis. The PES reference signal r(t), therefore, is a function of discrete time intervals and may also be regarded as r(i) or r(k).

The servo controller 110 generally comprises a feed-forward control path 125 that produces a feed-forward command effort $u_{ffwd}$, and a feedback control path 135 that produces a feedback command effort $u_{fb}$. Ultimately, as shown in FIG. 2, a summing junction 137 combines the feed-forward command effort $u_{ffwd}$ and the feedback command effort $u_{fb}$ to form the total command effort u (voltage or current) that causes the VCM 50/51 to accelerate in one direction or the other.

In more detail, one sees that the PES reference signal r is provided to both the feed-forward control path 125 and the feedback control path 135. The feed-forward control path 125, however, does most of the work. In particular, it receives the PES reference signal r and produces a feed-forward command effort $u_{ffwd}$ to move the transducer 80 along the shaped position profile or, equally speaking, to move the transducer with a correspondingly shaped acceleration profile (e.g. a sinusoidal seek profile that improves settling time and reduces acoustic noise).

The preferred feed-forward control path 125 provides intersample, "multi-rate" control as discussed in the Multi-rate Feed-Forward Application discussed above, but a conventional "single-rate" feed-forward control path may be used as well. A multi-rate feed-forward control path 125 is preferred, however, because it more closely moves the transducer 80 along the shaped position profile than is otherwise possible during a short seek when relatively few servo samples are available. In particular, the feed-forward control path 125 outputs additional feed-forward command efforts $u_{ffwd}$ between 1× servo samples in order to produce a closer piece-wise approximation to the desired profile. The preferred feed-forward rate is 4×, or 4 times the 1× servo sampling rate.

The feedback control path 135 is formed with the PES reference signal r, the indicated PES signal y, a combining junction 138 that differences these two signals to produce an error signal e, and a compensator 120 with a designed transfer function D(z) that produces a feedback command effort $u_{fb}$ at the servo sampling rate based on the error signal e. In operation along side the feed-forward control path 125, the feedback control path 135 repeatedly attempts, throughout the seek, to correct any error remaining in the indicated PES signal y after the application of one or more prior feed-forward command efforts $u_{ffwd}$. If the feed-forward command efforts $u_{ffwd}$ are perfect, then the feedback control path 135 will not have to do any work. Due to virtually unavoidable deviations between the plant's actual frequency response G(z) and the modeled frequency response $G_0(z)$ that was assumed when designing the PES reference signal r the feed-forward command effort signal $u_{ffwd}$ and, however, it is likely that the feed-forward command efforts $u_{ffwd}$ will be imperfect such that transducer 80 overshoots or undershoots the target position, thereby requiring further feedback command effort $u_{fb}$ and detrimentally extending the overall seek time.

In the Adaptive Control Path Application, described above, the approach taken is to provide an adaptive control path that monitors the error signal e during the first several samples of a seek in order to characterize any modeling error between the modeled VCM response $G_0(z)$ and the actual VCM response G(z) and thereafter outputs an adaptive command effort during subsequent samples to compensate for such modeling error. That approach may still be used with the present invention, but the herein described method takes the different approach of tuning or calibrating the PES reference signal r the feed-forward command effort signal $u_{ffwd}$ for all seeks, in advance of any one seek.

B. The Preferred Embodiment—In More Detail

Figure 3:
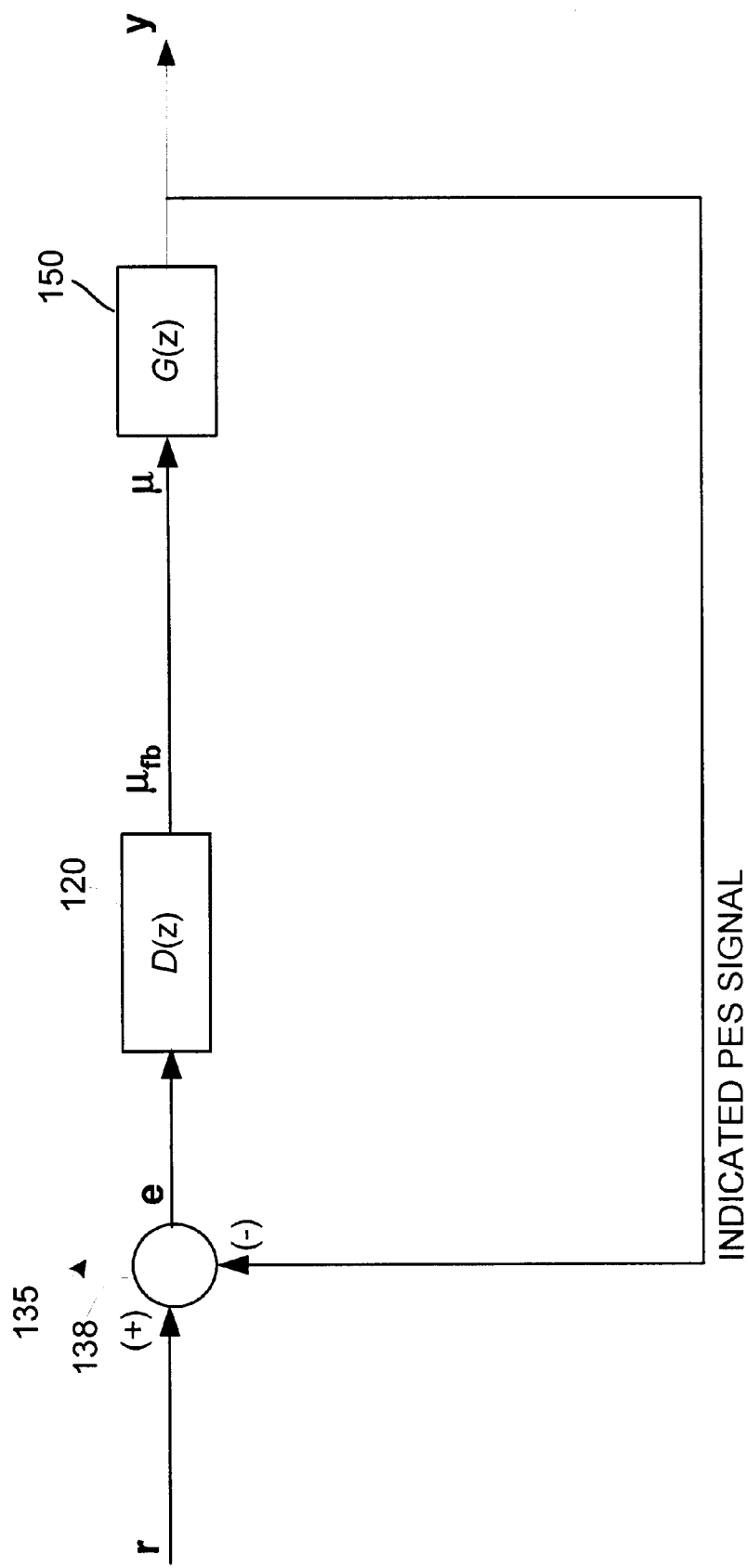
FIG. 3 is a block diagram of a feedback-only control system for a disk drive.
Figure 4:
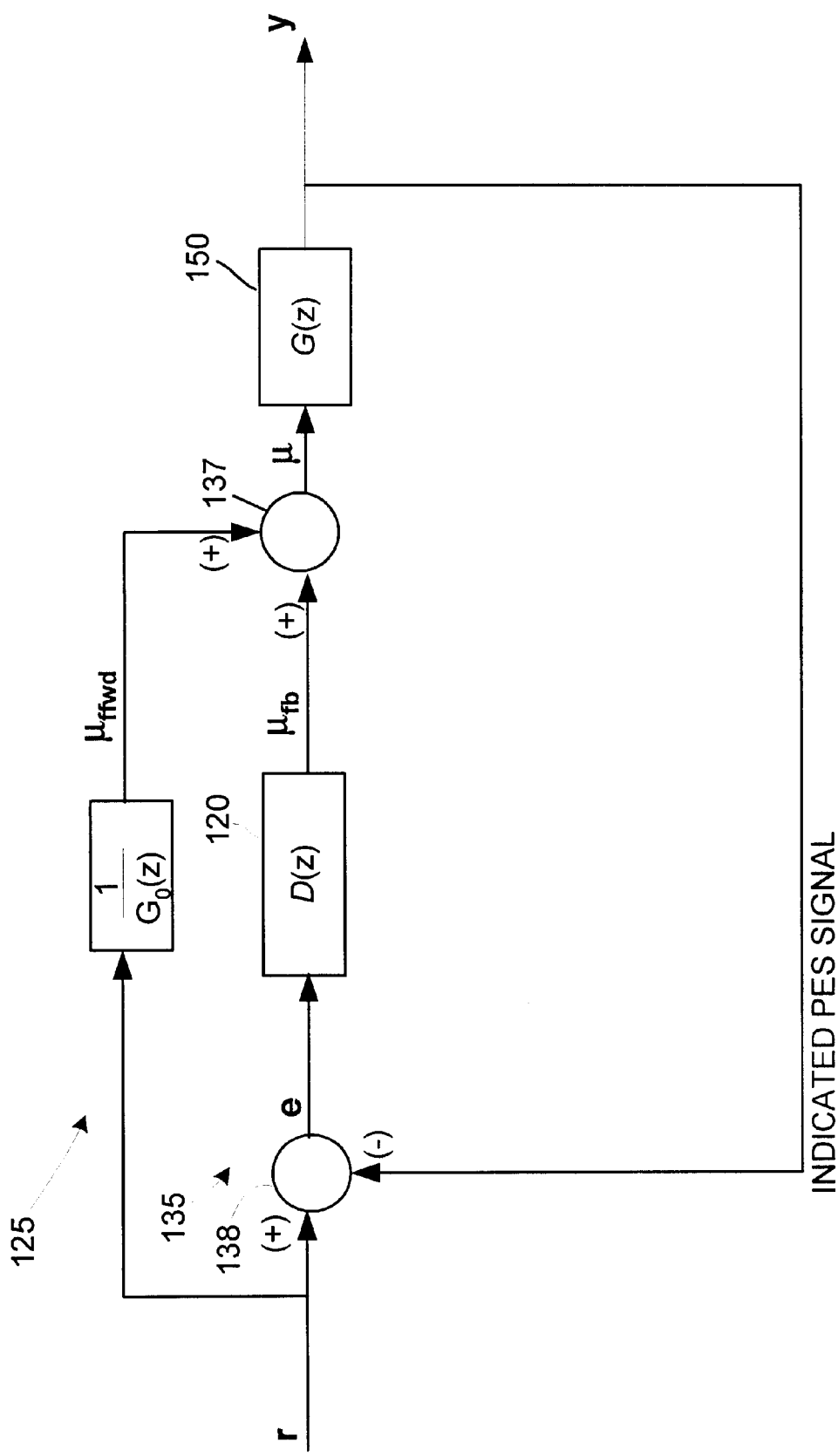
FIG. 4 is a block diagram of a feedback-corrected feed-forward control system for a disk drive.

FIGS. 3 and 4 are block diagrams of control systems, FIG. 4 being a simplified view of servo controller 110 and plant

150 of FIG. 2. In particular, for clarity's sake, FIG. 4 does not show any specific method for producing the PES reference signal r or require a multi-rate feed-forward control path 125.

FIG. 3 shows the feedback loop 135 in isolation. Applying algebraic control system analysis, one can easily state the error signal e in terms of the PES reference signal r as follows:

$$e = \left(\frac{1}{1+DG}\right)r \quad (1)$$

As is well known, and assuming that the product DG is large, the error signal e will deviate from the PES reference signal r according to the small, but nonzero value of the parenthetical quantity in equation (1), i.e.:

$$\left(\frac{1}{1+DG}\right) \quad (2)$$

As a result, the product of the parenthetical quantity of equation (2) and the value of the PES reference signal r represents the deviation between the desired position and the realized position due to the shortcomings of feedback control, a term that may be regarded as the feedback tracking error:

$$\left(\frac{r}{1+DG}\right) \quad (3)$$

FIG. 4 shows the feed-forward control path 125 in combination with the feedback control path 135 of FIG. 3. In this case, algebraic control system analysis allows us to state the error signal e in terms of the PES reference signal r as follows:

$$e = \left(1 - \frac{G}{G_0}\right)\left(\frac{1}{1+DG}\right)r \quad (4)$$

Comparing the feed-forward/feedback equation (4) to the feedback-only equation (1), one can see that the following new term arises, a term that may be regarded as the "modeling error":

$$\left(1 - \frac{G}{G_0}\right) \quad (5)$$

The equation (5) term is the relative modeling error between the modeled frequency response $G_0(z)$ within the feed-forward control path 125 and the actual frequency response $G(z)$ of the plant 150 being controlled. Note, that if the modeled frequency response $G_0(z)$ exactly matched the actual frequency response $G(z)$, then the modeling error of equation (5) would evaluate to zero and the overall error signal e specified in equation (4) would also be zero. As a practical matter, however, the modeled frequency response $G_0(z)$ will not equal the actual frequency response $G(z)$, the error signal e corresponding to the system of FIG. 4 will vary from the ideal, and such a system will benefit from the on-the-fly adaptation described in the Adaptive Control Path Application, or from advance tuning as described herein, or both.

The Preferred Multi-Rate Control Loop

Figure 5:
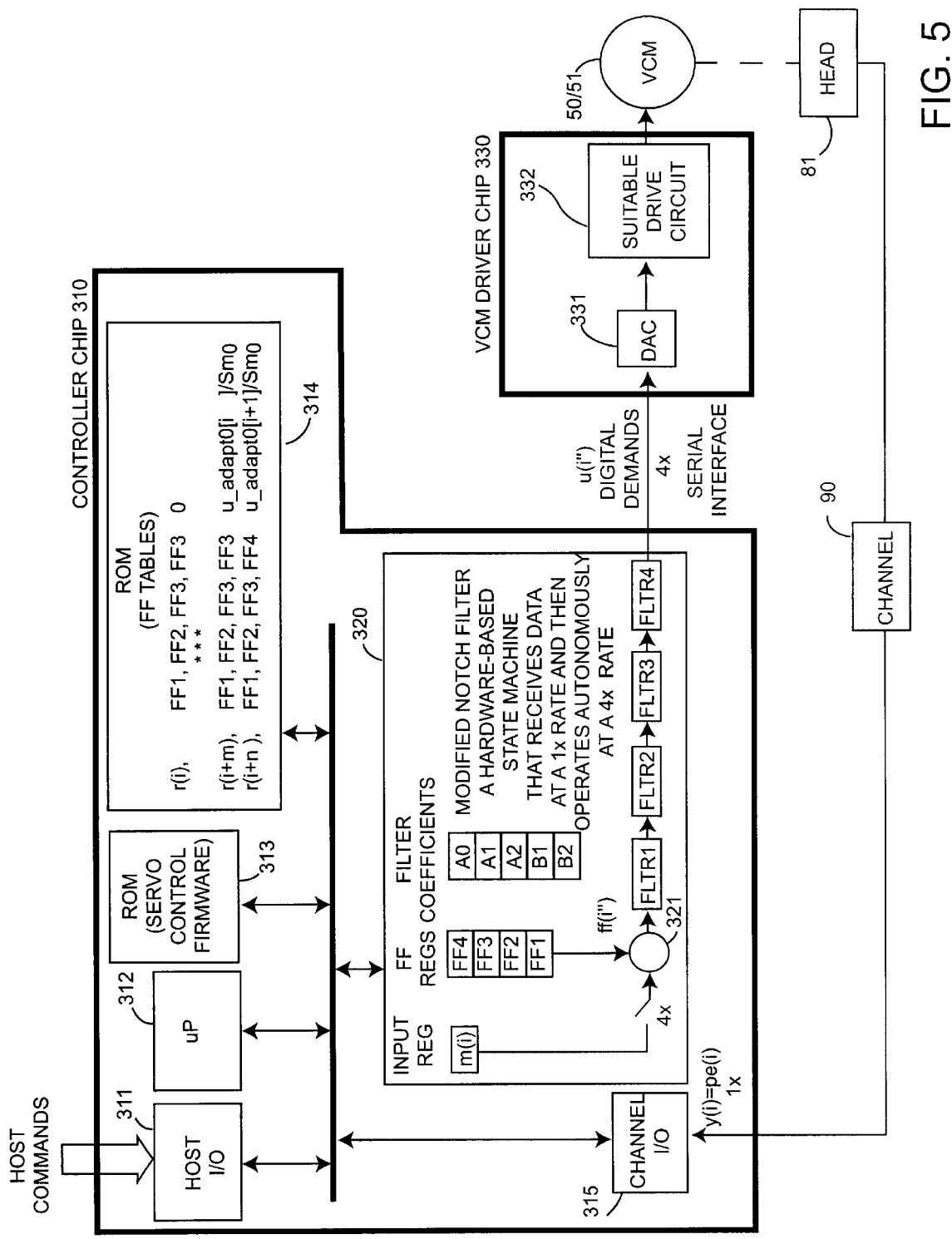
FIG. 5 is a block diagram of a representative control loop embodiment wherein the PES reference signal r(i) for each $i^{th}$ sample period and the related feed-forward values FF1, FF2, FF3, and FF4 (four in this embodiment) are stored in suitable tables and provided to a suitable hardware-based state machine 220 for output as multi-rate digital demands u(i") at a 4x rate.

FIG. 5 is a block diagram of a representative control loop that is less abstract than FIGS. 1 and 2. Here, the control loop comprises a controller chip 310, a VCM driver chip 330, the VCM 50/51, the head 80, and a read channel 90. In this particular embodiment, the functional equivalent of the servo controller 110 of FIGS. 1 and 2 is implemented by suitable portions of the controller chip 310 and the VCM driver chip 330.

As suggested by FIG. 5, suitable firmware tables are used to store a plurality "n" of PES reference signals r(i) (after normalization) during which feed-forward will be implemented, the related feed-forward values FF1, FF2, FF3, and FF4 (four in this embodiment) for each PES reference r(i), and adaptation quotients $u\_adapt_0[i]/S_{m0}$ that are zero during an initial "m" learning samples and are non-zero during a remaining n-m adaptation samples. The adaptation quotients relate to the Adaptive Control Path Application. In this particular embodiment, a succession of input values m(i) and the four feed-forward values are provided at a 1× rate to a state machine 220 for output as multi-rate digital demands u(i"). These tables are discussed in more detail below.

The controller chip 310 includes a microprocessor 312 for executing servo and non-servo programs. The microprocessor, for example, executes a servo control algorithm stored in a read-only memory (ROM) 313. The controller chip 310 receives host commands from a host (not shown) via a host I/O block 311 and receives an indicated PES signal pe(i) from the channel 90 via a channel I/O block 315.

The controller chip 310 would ordinarily develop a total command effort based on the difference m(i) between the target position and the indicated PES signal 151. Here, however, the controller chip 310 uniquely includes a table ROM 314 and a multi-rate state machine 320 that, concurrent with the execution of non-servo programs by the microprocessor 312, autonomously applies a feed-forward command effort signal at a feed-forward rate that is greater than the servo sampling rate to move the transducer more closely along the shaped position profile between servo samples. The preferred state machine 320 also implements, as suggested by FIG. 5, a notch filter function that dampens mechanical resonances while outputting multi-rate demands u(i") based on the feed-forward values stored in the table ROM 314. In particular, after a servo wedge has been read and an indicated position 151 has been returned by the channel 90, the servo control firmware, which is running on the microprocessor 312, accesses the appropriate data in the table ROM 314, calculates a modified demand value m(i) by subtracting the indicated position 151 from a suitably scaled version of the PES reference signal r(i), and then loads the demand value m(i) (ideally zero) and the feed-forward values FF1, FF2, FF3, FF4 into corresponding registers in the state machine 320. The state machine 320 thereafter process these values at a 4× rate in order to output four successive digital demands u(i") at a 4× rate based on the modified demand value m(k) and the feed-forward values FF1, FF2, FF3, FF4.

The preferred state machine is a notch filter implemented as a second order digital filter that operates according to this equation:

$$u(k") = A_0 n(k") + A_1 n(k"-1) - B_1 u(k"-1) - B_2 u(k"-2)$$

where n(k") is the input to the filter, u(k") is the output of the filter, and $A_0$, $A_1$, $A_2$, $B_1$, and $B_2$ are constant coefficients that determine the behavior of the filter.

The overall filter uses a chain of four filters FLTR1, FLTR2, FLTR3, FLTR4. In operation, the state machine 320 is oversampled at a 4× rate (as compared with the servo sample rate) and the first filter FLTR1 is provided with a combination of the feedback-computed demand value m(k) and the following sequence of four inputs $n_1(k)$ as suggested by the combining junction 321 of FIG. 5:

$$n_1(k'')=m(k'')+FF1$$

$$n_1(k''+1)=m(k'')+FF2$$

$$n_1(k''+2)=m(k'')+FF3$$

$$n_1(k''+3)=m(k'')+FF4$$

The output of each filter feeds the input of the next such that:

$$n_2(k'')=u_1(k'')$$

$$n_3(k'')=u_2(k'')$$

$$n_4(k'')=u_3(k'')$$

The VCM driver chip 330 contain a DAC 331 that receives the digital demands u(i") from the state machine 320 and converts them to an analog value (typically a voltage) that is further provided to a suitable drive circuit 332 that drives the VCM 50/51 (typically with current).

The Feed-Forward Tables

The preferred disk drive uses multi-rate feed-forward control wherein the PES reference values r(k) are provided at one rate (1×) and the feed-forward command effort values $u_{ffwd}$ are more frequently provided at a higher rate (e.g. 3× or 4×).

The preferred embodiment uses one or more tables of values for this purpose. In particular, each table holds the PES reference values r(k), along with a plurality of pre-defined feed-forward values that are intended to drive the VCM along the virtual track defined by those same PES reference values r(k). The preferred embodiment provides four feed-forward values FF1, FF2, FF3, FF4 for each PES reference value r(k)

FIG. 6 is a table-selection table representing the feed-forward durations for short to medium length seeks, e.g. for seeks from as little as 1 track to as many as 160 tracks. The overall range of tracks from 1 to 160 is divided into five different sub-ranges that have difference feed-forward durations ranging from 6 to 28 samples k.

FIG. 7 is a representative feed-forward table used for 1–2 track seeks, the first column representing the sample i (servo wedge), the second column containing normalized PES reference values for use in creating the PES reference signal r(i) for different seek lengths, the third through sixth columns containing the feed-forward values that are used to output 4× demands u(i") between 1× servo samples, and the seventh column containing an adaptation factor that is particularly relevant to the Adaptive Control Path Application, but will not be fully described herein since it is not necessary to fully understand this invention.

As will become clearly below in connection with Applicants' preferred embodiment, FIGS. 7a–7c show how the feed-forward table of FIG. 7 will ultimately be modified. FIG. 7-a shows in bold the values that represent the positive portion of the feed-forward command effort signal $u_{ffwd}$, such values being scaled larger or smaller with the velocity-related scaling factor $K_{plus}$ in order to make the residual velocity equal zero (values not actually changed); FIG. 7-b shows in bold all of the values of the feed-forward command effort signal $u_{ffwd}$, such values being scaled up or down, together, on the basis of the position-related scaling factor $K_{ffwd}$ in order to make the final error signal equal zero (values not actually changed); FIG. 7-C shows in bold the values of the PES reference signal, some or all of the bolded PES reference values being individually adjusted up or down in view of the actual error signal experienced during the calibration process so that the PES reference, so tuned, results in substantially no feedback error signal during subsequent use (values not actually changed).

FIGS. 8–10 are representative feed-forward tables used for 3–15 track seeks, 16–35 track seeks, and 36–80 track seeks. The longest table for seek lengths of 81–160 tracks has been omitted for the sake of brevity, but it is structurally the same as the others. The preferred embodiment of this invention can be best understood with reference to one of the feed-forward tables described above. The 1–2 track seek table of FIG. 7 will be used for the sake of simplicity.

As already noted, the PES reference signal r varies from a non-zero value to zero as a function of time t. The preferred PES reference signal r, moreover, is normalized to one track such that the non-zero value (e.g. 32,767) represents the command effort required to seek one track. It represents the intended positions of the actuator relative to a final target position, as it moves over time t from an initial track position to the final target position. It is, if you will, a moving target that guides the actuator to the final target position. The PES reference signal r(t) is, therefore, sometimes regarded as a "virtual track."

In the preferred disk drive, the feed-forward command effort signal $u_{ffwd}$ drives the VCM along the virtual track defined by the PES reference signal r. The PES reference signal r and corresponding feed-forward command effort signal $u_{ffwd}$ are stored in the above-described tables at the time of manufacture. are predetermined as discussed below.

A straightforward approach to developing the values for such a table is to first select r and then determine $u_{ffwd}$ accordingly. In the preferred embodiment, however, $u_{ffwd}$ is selected first in order achieve some performance criteria such as access time or reduced acoustic levels, and then r is computed from the modeled response $G_0$ as $$r=G_0*u_{ffwd}$$

Figure 11:
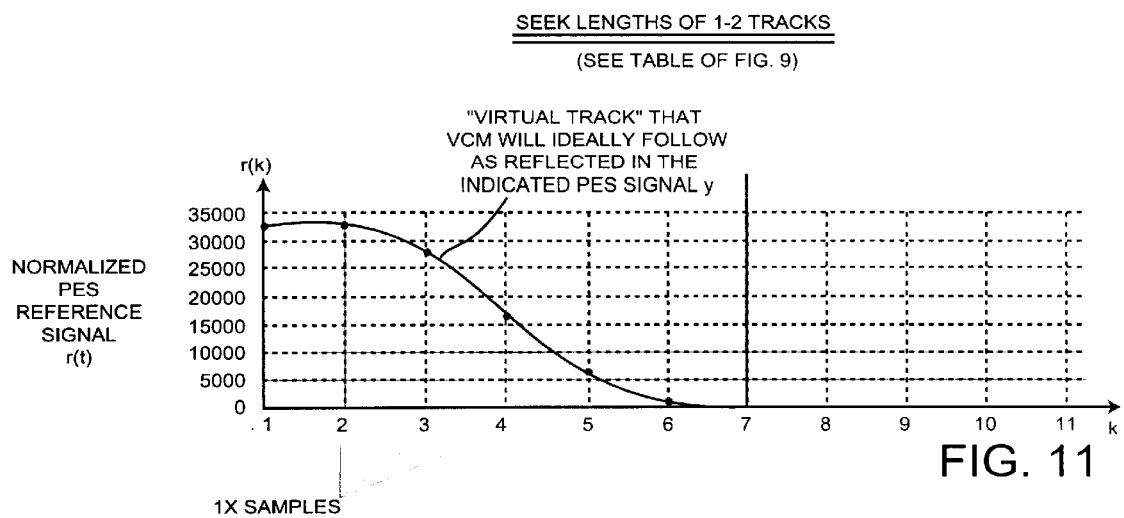
FIG. 11 is a plot of the six PES reference values from the 1–2 track seek table of FIG. 7, the six values collectively forming a PES reference signal r(i) that defines a "virtual track"

FIG. 11 is a plot of the normalized PES reference signal r(i) from the 1–2 track seek table of FIG. 7. As already noted, the values for the PES reference signal r(i) provide maximum resolution given a 16-bit two's complement representation and are normalized to a one track seek. In particular, note that the PES reference signal r(i) starts at the maximum positive number using the 16-bit two's complement representation (32767) and is then reduced toward zero during the subsequent 1× sample periods. The PES reference signal r(i) is used without modification, therefore, for a 1 track seek and is scaled by a factor of 2 for a 2 track seek. The other tables are similarly normalized to a one track seek such that the values of the PES reference signal r(i) are conveniently scaled in a like manner.

Figure 12:
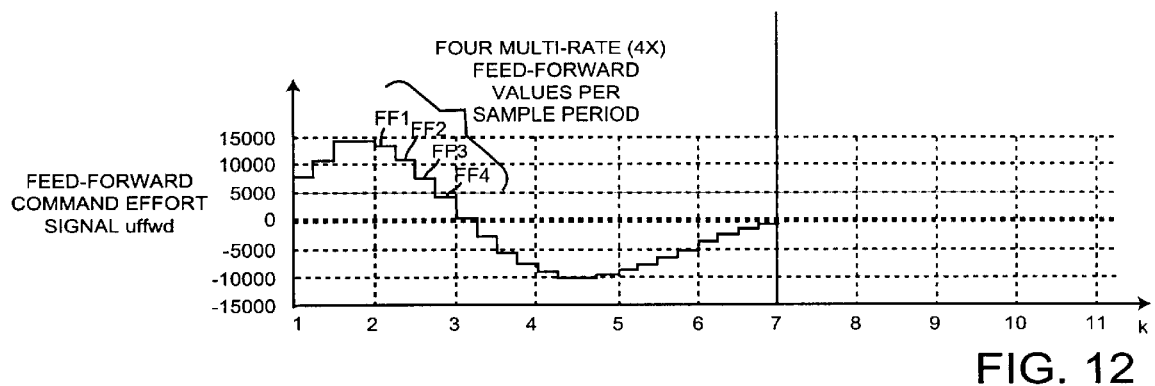
FIG. 12 is a plot of the twenty-four feed-forward values from the 1–2 track seek table of FIG. 9, the twenty-four values collectively forming a feed-forward command effort signal $u_{ffwd}$.
Figure 13:
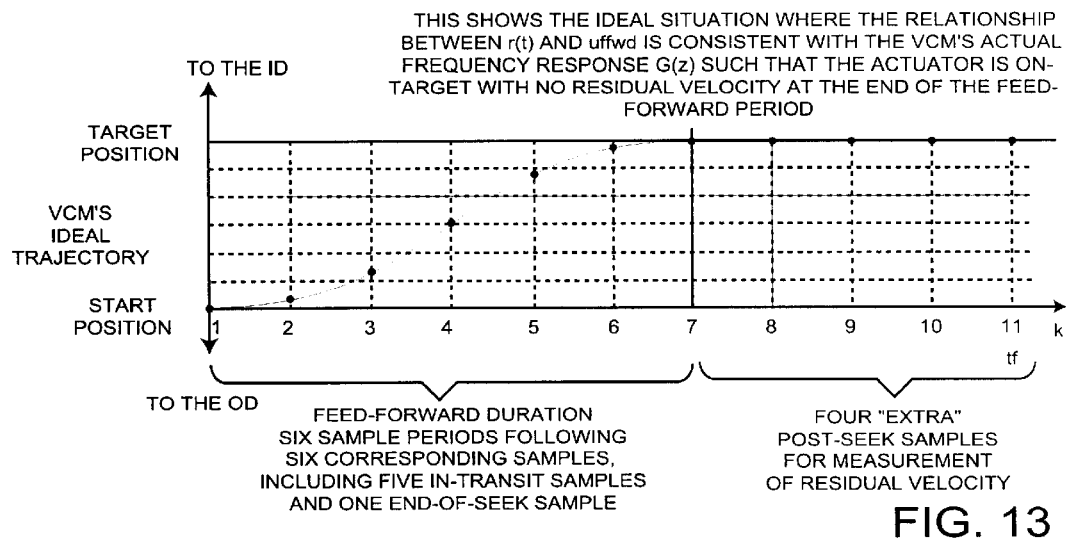
FIG. 13 is a plot of the VCM's trajectory when the feed-forward command effort signal (derived from the values of FIG. 12) moves the actuator from a starting position to a final target position in the ideal situation where the relationship between the PES reference signal r(i) of FIG. 11 and the feed-forward command effort signal $u_{ffwd}$ of FIG. 12 is consistent with the VCM's actual frequency response.
Figure 14:
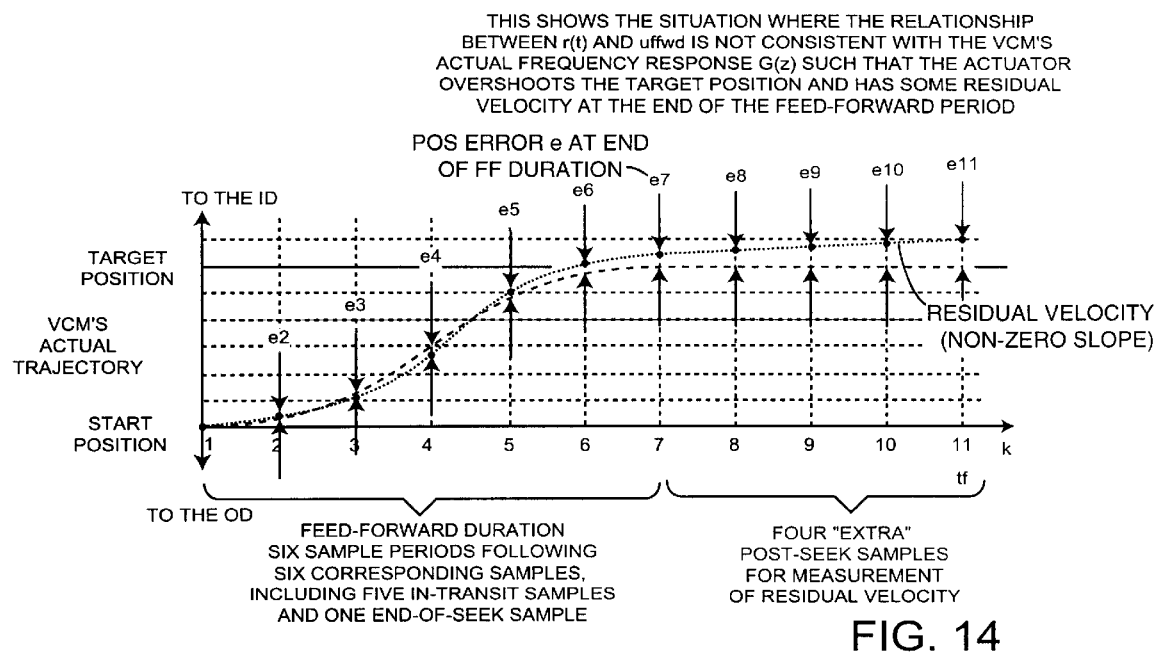
FIG. 14 is an exemplary plot of an actual VCM trajectory, relative to an ideal trajectory, when the feed-forward command effort signal (derived from the values of FIG. 12) moves the actuator from a starting position to a final target position in the not-so-ideal situation where the PES reference signal r(i) of FIG. 11 and the feed-forward command effort signal $u_{ffwd}$ of FIG. 12 are incompatible with one another given the VCM's actual frequency response.

FIG. 12 is a plot of the feed-forward values from the 1–2 track seek table of FIG. 7. The four feed-forward values FF1, FF2, FF3, FF4 that are associated with the second sample period (i=2) are also identified on the graph. The feed-forward values are also normalized to a one-track situation so that they are easily scaled for seeks of various length seeks. Note that in this actual case, the acceleration profile represented by FIG. 12 is a modified sinusoid that has been found to provide better performance than a true sinusoid.

If the plant's actual response G perfectly matches the modeled response $G_0$ that was originally used to derive the PES reference values r(k) from the feed-forward command effort values $u_{ffwd}$, or vice verse, then the feed-forward command effort values of FIG. 12 WOULD, in fact, precisely move the actuator to the final target position along the "virtual track" defined by the PES reference signal r(k) of FIG. 11. In other words, if the PES reference signal and feed-forward command effort signal were perfectly tuned for a particular drive, the actuator would ultimately be positioned at the final target position or final commanded position with zero residual velocity. It is highly unlikely, however, that a particular drive would be suitably "in tune" with the default values of the PES reference signal r(t) and the corresponding values of the the feed-forward command effort signal $u_{ffwd}$. This is because of the nearly unavoidable variance between the actual response G and the modeled response $G_0$ that was originally used to correlate the values. In particular, the modeled response $G_0(z)$ may be so simple that it does not capture all dynamics of interest (e.g. a rigid body model), the plant's actual response G may vary with operating conditions or over time, or both.

The goal, though, is to have an ideal state of affairs at the end of the feed-forward sequence. In particular, we want to satisfy a "terminal position condition" and a "terminal velocity condition" at final time $t_f$ as follows:

| | |
|---|---|
| $y(t_f) = 0$ | i.e. the terminal position error or PES is zero in that the terminal position equals the final target position or, in other words, the virtual track actually leads to the final target position, not to one side or the other; and |
| $v(t_f) = 0$ | i.e. the terminal velocity is zero or, in other words, the actuator does not keep moving after it has reached the final target position. |

In lay terms, we want zero position error and zero residual velocity. We want the actuator to be where it is supposed to be at the end of the feed-forward sequence, and we want it to stay there with little or no further effort on the part of the servo control system.

The pre-defined feed-forward values stored in our table, however, were derived from a rigid body $(1/S^2)$ model that will not match the response of the actual drives in varying degrees from drive to drive. A rigid body $(1/S^2)$ model that assumes that the plant 150 has the same response in terms of magnitude and phase for all frequencies. That is obviously not true in reality. There remains a need, therefore, to tune the PES reference values r and the feed-forward command values such that they provide the desired terminal conditions in view of the VCM's actual (or likely actual) frequency response.

If the model used to derive the feed-forward values differs from the response of the actual disk drive, the use of those values will cause the head to over or undershoot the final commanded position at the end of the feed-forward sequence, leave the head with a residual velocity at the end of the feed-forward sequence, or both.

In accordance with this invention, however, it is possible to tune a group of drives, or even individual drives given sufficient processing power, such that the feed-forward values will more closely cause the actuator in a particular drive to more probably come to the end of a seek with no position error and no residual velocity.

The Tuning Method

Figure 15:
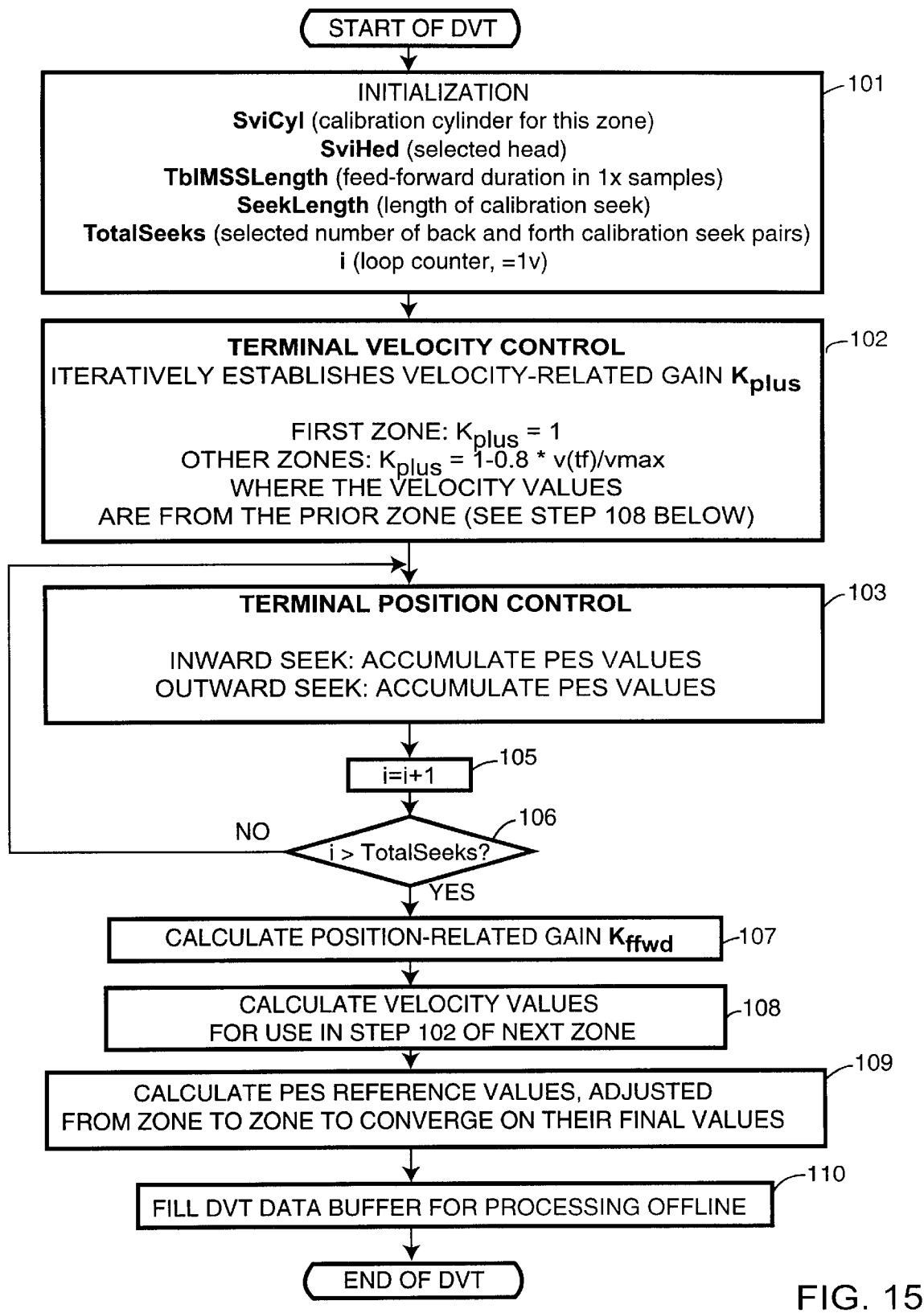
FIG. 15 is a flow chart illustrating a preferred method of tuning the normalized PES reference signal r and the associated feed-forward command effort signal $u_{ffwd}$ by repeatedly seeking a given head back-and-forth at a given location while gathering data values that are used to tune the feed-forward command effort signal $u_{ffwd}$ and reference PES signal r contained in each of the feed-forward tables.

FIG. 15 is a flow chart illustrating a preferred method of tuning the normalized PES reference signal r and the associated feed-forward command effort signal $u_{ffwd}$ by repeatedly seeking a given head back-and-forth at a given location while gathering data values that are used to tune the feed-forward command effort signal $u_{ffwd}$ and reference PES signal r contained in each of the feed-forward tables.

In particular, the method produces:

(1) a velocity-related scaling factor $K_{plus}$ and a position-related scaling factor $K_{ffwd}$ that are collectively used to modify the table's feed-forward values and thereby tune the feed-forward command effort signal $u_{ffwd}$ such that the VCM tends to arrive substantially on-track with substantially no residual velocity; and (2) a set of 1× error values e that are used to modify the PES reference values and thereby tune the PES reference signal r to more closely correlate with the feed-forward command effort signal $u_{ffwd}$ that was tuned as described above.

As is well known, there are slightly different characteristics in terms of linearity, and so on, at different locations on the disk. The preferred tuning method, therefore, is accomplished in multiple zones (e.g. eight) in order to average out any position related affects. The flow chart of FIG. 15, therefore, only reflects part of the preferred method in that the steps shown are repeated in several calibration zones.

The preferred method is implemented as a Design Verification Test (DVT), a DVT being a small program that resides in each disk drive's firmware for use in verifying the drive's proper operation. The preferred embodiment uses an ATTF script file to rotate through the eight zones while invoking the DVT of FIG. 15 for each such zone.

At step 101, the system initializes a number of parameters that are used in the calibration. The "Svi" prefix stands for servo interface.

SviCyl defines the cylinder at which calibration will be performed.

SviHed is used to specify a selected head in that it is possible to individually calibrate each head or to calibrate all heads and then average the results. The inventors have determined, however, that variability is not strongly correlated with head differences. Accordingly, satisfactory results may be obtained more rapidly by using only one head, e.g. head 0, and then using the calibration results for all heads.

SeekLength contains the length of the seek in tracks.

TblMSSLength contains a scalar value that represents the feed-forward duration in sample periods "n" (see FIG. 7) corresponding to the selected seek length.

TotalSeeks is the selected number of back-and-forth seeks, or calibration seek pairs that will be used for tuning. It should be large enough to average out noise (e.g. 1024).

"i" is the loop counter.

At step 102, the system initializes and thereafter iteratively establishes a velocity-related scaling factor $K_{plus}$.

On the first past corresponding to the first zone (at e.g. track 50), the initial velocity-related scaling factor $K_{plus}$ is set to unity, i.e. $K_{plus}=1$. However, for the second and subsequent zones (at e.g. tracks 550, 1050, and so on), the velocity-related scaling factor $K_{plus}$ is modified by using velocity data gathered in the prior zone. The velocity-related scaling factor $K_{plus}$ is established at the start of the second through eighth zones according to the weighted formula:

$$K_{plus} = 1 - \frac{0.8 * v(t_f)}{v_{max}}$$

where $v(t_f)$ is the residual velocity as calculated from the extra samples taken after the end of the nominal feed-forward duration and where $v_{max}$ is estimated as two times the average velocity during calibration in a particular zone (it does not need to precise due to the iterative operation).

An 80% combining factor, or other fractional value, is used so that the ultimate velocity-related scaling factor $K_{plus}$ will tend to under-correct and to not introduce oscillation into the system when used to modify the positive values of the corresponding feed-forward table. The velocity-related scaling factor $K_{plus}$ naturally converges to one final value with contribution from all eight zones. A typical value might be 0.95.

The velocity-related scaling factor $K_{plus}$ is used to scale a portion of the feed-forward command-effort signal $u_{ffwd}$ relative to a remaining portion such that the velocity of the VCM at the end of the seek for this and all similar drives will be at or near zero or, in other words, such that the terminal velocity is at or near zero. The "plus" part of this scaling factor's name comes from the fact that the preferred scaling factor will be used to scale up (e.g. $K_{plus}$=1.1.) or scale down (e.g. $K_{plus}$=0.9) the positive or "plus" portion of the feed-forward command effort signal $u_{ffwd}$ in the feed-forward table being used for the seek length under calibration.

It has been empirically determined that using the shortest seek length governed by a particular feed-forward table is sufficient to calibrate each table for all of its seek lengths. The 1–2 track table of FIG. 7, for example, is calibrated with 1 track seeks; the 3–15 track table of FIG. 8 is calibrated with 3 track seeks; the 16–35 track table of FIG. 9 is calibrated with 16 track seeks, and so on.

At step 103, the system performs two back and forth seeks—an inward seek from SviCyl and an outward seek that returns the transducer to SviCyl. The seeks are accomplished in an "open loop" manner in that the feedback compensator 120 D(z) is disabled and the VCM 50/51 is driven only by the feed-forward command effort signal $u_{ffwd}$ comprising the feed-forward values in the feed-forward table being calibrated. During successive passes through step 103, the system accumulates and ultimately averages the PES data or error values e throughout the nominal feed-forward duration of each seek and, for purposes of gathering residual velocity data, slightly beyond (e.g. four additional sample periods).

In particular, the system accumulates several error values e for each of the 1× samples during three phases: (1) during the seek, (2) at the very end of the seek, and (3) beyond the seek:

(1) The "in-transit" error values e accumulated during the seeks are indicative of how closely the VCM's actual trajectory follows the predicted trajectory represented by the PES reference signal r that is stored in the feed-forward table. This is because each such error value e represents the difference between the indicated PES y and the PES reference r that was originally predicted using the VCM's modeled response and stored in the feed-forward table.

Later, the system will use the several in-transit error values e to modify the PES reference signal r. In particular, the several error values e will ultimately be averaged, on a 1×-by-1× sample-time basis, and such values will be used to scale up or down the 1× values of original PES reference signal r.

(2) The "end-of-seek" error value e accumulated at the end of each seek indicates whether or not the VCM accurately positioned the transducer to the target position (PES=0), or not (PES≠0). The "end" of the seek corresponds to the end of the feed-forward duration.

(3) The four additional "post-seek" error values e that are accumulated after the end of the seek are data points needed to detect any residual velocity that may be present.

The preferred system seeks back-and-forth between SviCyl to SviCyl+1 (in the case of a 1 track calibration for this particular table). The system, in other words, affects an inward seek from SviCyl to SviCyl+1, followed by an outward seek from SviCyl+1 to SviCyl, and so on. The error values e associated with alternative seeks are sign inverted and all corresponding values are accumulated.

At step 105, the system increments the loop counter "i".

At step 106, the system compares the loop counter "i" with TotalSeeks. If the counter is less than TotalSeeks, then flow returns to step 102b. IF the counter exceeds TotalSeeks, then flow continues to step 107.

At step 107, the system calculates the feed-forward gain or position-related scaling factor $K_{ffwd}$ that will be used to help ensure that the VCM that completes a seek with little or no residual velocity, will also be positioned substantially at the desired target position $r_0$. The position-related scaling factor $K_{ffwd}$, in other words, is used to provide the terminal position condition of $y(t_f)$=0, i.e. the position at the end of the calibration should be such that the indicated PES y is zero. The calculation of the position-related scaling factor $K_{ffwd}$ is straightforward. It is simply:

$$K_{ffwd} = \frac{y(0)}{y(0) - y(t_f)}$$

where $y(0)$ is the indicated PES at the beginning of the seek and $y(t_f)$ is the indicated PES at the end of the test period.

In other words, if the tuning on the first zone is being done at track 50 such that SviCyl=50, and if table being tuned is the 1–2 track table such that the SeekLength is 1 track, then the system will by this point have positioned the head back-and-forth between track 50 and track 51 while accumulating 2048 error values e for each of the ten sample periods associated with a one track seek (five in-transit samples 2–6, one end-of-seek sample 7, and four post-seek samples 8–11).

At step 108, the system calculates the terminal velocity $v(t_f)$ for use in the next pass through step 102. Here, the system looks at the error signal e, or equivalently the indicated PES y, for an extra four sample periods in order to calculate any residual velocity (ideally there is none). The system, in other words, looks to determine if there is any change in position as a function of time during the extra sample periods.

The preferred embodiment derives the terminal velocity $v(t_f)$ by evaluating the difference in magnitude between the the $2^{nd}$ and $4^{th}$ post-seek samples and by divides that difference by 2T.

At step 109, the system calculates the PES reference values r, which values are adjusted from zone to zone in order to converge on their final values.

At step 110, the system fills a DVT data buffer from which the values may be retrieved and transferred into an analysis package that runs on a desktop computer, like Matlab☐, in order to combine the newly derived velocity-related scaling factor $K_{plus}$ and position-related scaling factor $K_{ffwd}$ with similar values from other representative drives and ultimately, using such values, to recalculate the table values corresponding to the PES reference signal r and the feed-forward command effort signal $u_{ffwd}$. More particularly, the velocity-related scaling factor $K_{plus}$ and position-related scaling factor $K_{ffwd}$ are used to modify the feed-forward values making up the feed-forward command effort signal $u_{ffwd}$, and the accumulated error values $e_2$ to $e_7$ are used to modify corresponding ones of the PES reference values making up the PES reference signal r.

At present, the tuning is done on a representative group of drives that each produce results, the results are process offline, averaged, put into other verification drives, verified, and ultimately put into all other drives. Of course, if there were sufficient processing resources in the disk drive, such modifications could be done in each individual drive using the drive's firmware, on a drive-by-drive basis, without any off-line manipulation and without testing a representative group of drives, combining their results, and applying them to all other drives on a statistical basis.

We claim:

1. A method of tuning a servo control system in a disk drive having a disk with servo control information recorded thereon, a transducer for reading the servo control information, a servo control system that produces a control signal by combining (1) a feed-forward command effort signal $u_{ffwd}$ and (2) a feedback command effort signal $u_{fb}$ derived from a difference between (i) a target position that is controllably varied during a seek with a PES reference signal r and (ii) an indicated position that includes an indicated PES signal y derived from the servo control information read by the transducer, and a voice coil motor (VCM) characterized by an actual frequency response G(z) for positioning the transducer in response to the control signal r wherein the feed-forward command effort signal $u_{ffwd}$ and the PES reference signal r are designed to be compatible with one another on the basis of a modeled frequency response $G_0(z)$ such that the PES reference signal r and indicated PES signal y vary in unison during a seek when the servo control system uses the feed-forward command effort signal $u_{ffwd}$ to position the transducer from an initial track position to a final target position, and wherein the actual frequency response G(z) is different than the modeled frequency response $G_0(z)$ such that the feed-forward command effort signal $u_{ffwd}$ and the PES reference signal r are not compatible with one another, the method comprising the steps of scaling the feed-forward command effort signal $u_{ffwd}$ to substantially achieve a zero velocity condition at an end of a seek;

scaling the feed-forward command effort signal $u_{ffwd}$ to substantially achieve an on-target condition at the end of the seek; and modifying the PES reference signal r such that it substantially varies in unison with the indicated PES signal y during the seek.

2. The method of claim 1 wherein the PES reference signal r and the feed-forward command effort signal $u_{ffwd}$ are contained in a table.

3. The method of claim 2 wherein the table has one PES reference value and a plurality of feed-forward values for each sample period over which the seek will be affected.

4. The method of claim 2 comprising a plurality of tables for a corresponding plurality of seek ranges.

5. The method of claim 1 wherein the step of scaling the feed-forward command effort signal $u_{ffwd}$ to substantially achieve a zero velocity condition at an end of the seek is accomplished by scaling only a portion of feed-forward command effort signal $u_{ffwd}$.

6. The method of claim 1 wherein the step of scaling the feed-forward command effort signal $u_{ffwd}$ to substantially achieve a zero velocity condition at an end of the seek is accomplished with a velocity-related scaling factor $k_{plus}$, wherein the step of scaling the feed-forward command effort signal $u_{ffwd}$ to substantially achieve an on-target condition at the end of the seek is accomplished with a position-related scaling factor $k_{ffwd}$.

7. The method of claim 6 wherein the velocity-related scaling factor $k_{plus}$ and position-related scaling factor $k_{ffwd}$ are developed by testing a representative group of drives.

8. The method of claim 6 wherein the velocity-related scaling factor $k_{plus}$ is developed by the further steps of:

performing a seek with the servo control system in an open loop condition where only the feed-forward command effort signal $u_{ffwd}$ is moving the VCM; and detecting error values representing a difference between the PES reference signal r and the indicated PES y for at least two servo sample periods beyond a feed-forward duration of the seek.

9. The method of claim 8 wherein the detecting step is accomplished by the further steps of:

performing a plurality of back-and-forth seeks, accumulating error values for each seek; and averaging the error values.

10. The method of claim 9 wherein the steps of performing, accumulating, and averaging are performed at a plurality of zones on the disk.

11. The method of claim 8 wherein the detecting step is performed in a plurality of representative drives.

12. The method of claim 8 wherein the feed-forward command effort signal $u_{ffwd}$ is substantially sinusoidal and wherein the velocity-related scaling factor $k_{plus}$ is applied to one half cycle of the feed-forward command effort signal $u_{ffwd}$ in order to vary that one half cycle relative and thereby cause the VCM have substantially zero velocity at the end of the seek.

13. The method of claim 6 wherein the position-related scaling factor $k_{ffwd}$ is developed by:

performing a seek with the servo control system in an open loop condition where only the feed-forward command effort signal $u_{ffwd}$ is moving the VCM; and detecting an error value representing a difference between the PBS reference signal r and the indicated PES y at the end of the seek.

14. The method of claim 13 wherein the detecting step is accomplished by the further steps of:

performing a plurality of back-and-forth seeks, accumulating error values for each seek, and averaging the error values.

15. The method of claim 14 wherein the steps of performing, accumulating, and averaging are performed at a plurality of zones on the disk.

16. The method of claim 13 wherein the detecting step is performed in a plurality of representative drives.

17. The method of claim 13 wherein the position-related scaling factor $$K_{ffwd} = \frac{y(0)}{y(0) - y(t_f)}$$

where y(0) is the indicated PES at the beginning of the seek and $y(t_f)$ is the indicated PES at the end of the test period.

18. The method of claim 1 wherein the step of modifying the PES reference signal r such that it substantially varies in unison with the indicated PES signal y during the seek is accomplished by performing a seek with the servo control system in an open loop condition where only the feed-forward command effort signal $u_{ffwd}$ is moving the VCM;

detecting error values representing a difference between the PES reference signal r and the indicated PES y for servo sample periods during a feed-forward duration of the seek; and varying the PES reference signal r based on the detected error values.

19. The method of claim 18 wherein the detecting step is accomplished by the further steps of:

performing a plurality of back-and-forth seeks, accumulating error values for each seek, and averaging the error values.

20. The method of claim 19 wherein the steps of performing, accumulating, and averaging are performed at a plurality of zones on the disk.

21. The method of claim 18 wherein the detecting step is performed in a plurality of representative drives.

22. The method of claim 18 wherein the PES reference signal r is contained in a table having one PES reference value for each sample period over which the seek will be affected.

* * * * *